UNITED STATES PATENT OFFICE.

RICHARD WHEELER, OF SAN FRANCISCO, CALIFORNIA, ASSIGNOR, BY DIRECT AND MESNE ASSIGNMENTS, TO L. J. WHEELER AND E. H. GOULD, OF SAME PLACE.

INSECTICIDE.

SPECIFICATION forming part of Letters Patent No. 460,227, dated September 29, 1891.

Application filed January 14, 1891. Serial No. 377,762. (No specimens.)

*To all whom it may concern:*

Be it known that I, RICHARD WHEELER, a citizen of the United States, residing in the city and county of San Francisco, State of California, have invented an Improvement in Insecticides; and I hereby declare the following to be a full, clear, and exact description of the same.

My invention relates to an improved insecticide and fungicide and the preparation thereof, so that it may be transported and stored in the solid form, while at the same time being susceptible of solution and reduction to a liquid form when it is to be used.

In preparing my compound, I use unslacked lime, sulphur, water, and salt, these ingredients being mixed in a certain order and subjected to heat for a considerable length of time, so that the material may be poured into molds of any suitable or desired form, where it will immediately stiffen and become solid and in condition for convenient transportation or storage. At the same time it is not so hard as to make it difficult to break up and dissolve, when desired.

To make my compound I take, by weight, thirty pounds of unslaked lime, twenty pounds of sulphur, and add thereto twenty-five or thirty pounds of water. This compound is then heated to a condition in which it will just simmer or boil a little, and is kept in this condition from three to six hours. Afterward I add fifteen pounds of salt and keep up the heat for about one hour longer. The whole mass is then thoroughly incorporated and may be poured into molds of any desired form or size, when it will immediately harden into a solid cake without any process of evaporation or refrigeration. At the same time these cakes are sufficiently friable to be easily broken up into any desired sizes, and can then be dissolved and reduced to a liquid condition for the purpose of spraying the plants upon which the compound is to be used.

I am aware that compounds containing ingredients similar to the above have been made in a liquid form; but I am not aware that such a compound has been so made as to solidify into a solid mass.

Having thus described my invention, what I claim as new, and desire to secure by Letters Patent, is—

The herein-described insecticide in dry and solid form, capable of disintegration and suspension in water and containing lime, sulphur, and salt in substantially the proportions set forth.

In witness whereof I have hereunto set my hand.

RICHARD WHEELER.

Witnesses:
S. H. NOURSE,
J. A. BAYLESS.